(12) United States Patent
Akilov et al.

(10) Patent No.: US 7,512,597 B2
(45) Date of Patent: Mar. 31, 2009

(54) RELATIONAL DATABASE ARCHITECTURE WITH DYNAMIC LOAD CAPABILITY

(75) Inventors: Alex Akilov, Zichron Ya'akov (IL); David Harold Berk, Petach Tikva (IL); Yaakov Dolgov, Kfar Saba (IL); Aviad Sela, Yokne'am Ilit (IL); Uri Shani, Kiryat Motzkin (IL); Inna Skarbovsky, Kiryat Ata (IL)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 11/421,093

(22) Filed: May 31, 2006

(65) Prior Publication Data

US 2007/0282798 A1    Dec. 6, 2007

(51) Int. Cl.
*G06F 17/30* (2006.01)
(52) U.S. Cl. .......................................................... 707/3
(58) Field of Classification Search ...................... 707/2, 707/3, 10; 709/224
See application file for complete search history.

(56) References Cited

U.S. PATENT DOCUMENTS 6,965,897 B1   11/2005   Chen 6,985,912 B2 *  1/2006   Mullins et al. .......... 707/103 R
2005/0015374 A1  1/2005   Reinauer et al.

FOREIGN PATENT DOCUMENTS

WO      WO 02/41187      5/2002

OTHER PUBLICATIONS

D. Patel, "Storage file Mapping in Databases", Veritas Architecture Network, Apr. 22, 2003, http://www.parallelprose.com/parallelprose/white_papers/veritas_File_Mapping.pdf.
Li Weng et al., "An Approach for Automatic Data Virtualization", High Performance Distributed Computing, 2004. Proc. 13th IEEE International Symposium, Jun. 4, 2004, pp. 24-33.
S. Abdala et al., "From virtualized resources to virtual computing grids: the In-VIGO system", Future Generations Computer Systems, Amsterdam, vol. 21, No. 6, Jun. 2005, pp. 896-909.

* cited by examiner

*Primary Examiner*—Etienne P LeRoux

(57) ABSTRACT

A relational database architecture with Dynamic Load capability, including a relational database for storing records, a storage unit, a record dispatcher for storing a plurality of objects, each containing at least one record, in the storage unit, and a mapping of the objects to the records which they contain, where the record dispatcher is configured to receive a Dynamic Load Request including a key value of desired records, search the mapping to determine which of the objects in the storage unit contain records that match the key value, and load any of the matching records into the database.

16 Claims, 4 Drawing Sheets

RELATIONAL DATABASE ARCHITECTURE WITH DYNAMIC LOAD CAPABILITY

FIELD OF THE INVENTION

The present invention relates to computer database architectures.

BACKGROUND OF THE INVENTION

Some large companies, such as credit card companies and telephone companies, use large-scale relational database systems to store many millions of records per day, where each record is retained in a database on a direct access storage device for a period of time, after which the records are removed from the database. Such large-scale use might require terabytes of direct access storage to support ongoing queries. However, most queries require access to only a very small fraction of the entire database, with many records never being accessed at all during their retention period.

SUMMARY OF THE INVENTION

The present invention discloses a relational database architecture with Dynamic Load capability, where, instead of being stored in a database, records are stored in files on separately-managed external storage, and are loaded into the database dynamically in response to a request to access the records.

In one aspect of the invention a relational database architecture with Dynamic Load capability is provided including a relational database for storing records, a storage unit, a record dispatcher for storing a plurality of objects, each containing at least one record, in the storage unit, and a mapping of the objects to the records which they contain, where the record dispatcher is configured to receive a Dynamic Load Request including a key value of desired records, search the mapping to determine which of the objects in the storage unit contain records that match the key value, and load any of the matching records into the database.

In another aspect of the invention the objects are data files.

In another aspect of the invention the architecture further includes a query processor configured to receive a query from a computer, determine at least one key value that is the focus of the query, communicate the Dynamic Load Request including the key value to the record dispatcher, and execute the query on the database subsequent to the matching records being loaded into the database.

In another aspect of the invention the record dispatcher is configured to update the mapping to indicate the current location of any of the records as being in either of the database and the storage unit.

In another aspect of the invention the record dispatcher is configured to set an expiration time stamp for any of the records in accordance with a predefined length of time during which the record may reside in the database, and remove the record from the database when the expiration time stamp has been reached.

In another aspect of the invention the record dispatcher is configured to store any of the objects in the storage unit in compressed form, and decompress any of the records prior to loading the records into the database.

In another aspect of the invention the key is chosen based on a calculated likelihood that a future query of the database will select records on the basis of key values for the key, where the key is chosen if the likelihood exceeds a predefined value.

In another aspect of the invention the key is chosen where a past query of the database selected records on the basis of key values for the key.

In another aspect of the invention the mapping uses a single mapping record to map any of the objects to a plurality of the records contained in the object that have the same key value.

In another aspect of the invention the mapping uses a first mapping record to map any of the objects to a first plurality of the records contained in the object that have a first key value, and a second mapping record to map the object to a second plurality of the records contained in the object that have a second key value.

In another aspect of the invention the record dispatcher is configured to generate any of the objects to include only records with the same key value.

In another aspect of the invention the record dispatcher is configured to generate any of the objects to include only records having a key value from among any of a predefined number of different key values.

In another aspect of the invention the record dispatcher is configured to generate any of the objects to include a plurality of partitioned objects, each partitioned object including a subset of the records in the object, which subset is identified by a partitioning key.

In another aspect of the invention the record dispatcher is configured to load records from any of the partitioned objects in parallel to corresponding partitions of the database.

In another aspect of the invention the record dispatcher is configured to generate any of the objects by first populating the database with any of the records, and then removing any of the records from the database into newly-formed objects which are then stored in the storage unit.

In another aspect of the invention the architecture further includes a computer, and a query processor, where the computer is configured to communicate the Dynamic Load Request to the query processor prior to issuing a query to the query processor, and where the query processor is configured to execute the query on the database subsequent to the matching records being loaded into the database.

In another aspect of the invention the architecture further includes a computer, and a query processor, where the computer is configured to communicate the Dynamic Load Request to the record dispatcher prior to issuing a query to the query processor, and where the query processor is configured to execute the query on the database subsequent to the matching records being loaded into the database.

In another aspect of the invention the record dispatcher is configured to store any of the records in any of the objects where the stored records belong to one or more tables in the database, where the database includes other tables having records not stored in the objects.

In another aspect of the invention a relational database method with Dynamic Load capability is provided, the method including storing a plurality of objects, each containing at least one record, in a storage unit, mapping the objects to the records which they contain, receiving a Dynamic Load Request including a key value of desired records, searching the mapping to determine which of the objects in the storage unit contain records that match the key value, and loading any of the matching records into a relational database.

In another aspect of the invention any of the steps are performed with respect to objects that are in the form of data files.

In another aspect of the invention the method further includes receiving a query from a computer, determining at least one key value that is the focus of the query, and executing the query on the database subsequent to the matching records being loaded into the database.

In another aspect of the invention the method further includes updating the mapping to indicate the current location of any of the records as being in either of the database and the storage unit.

In another aspect of the invention the method further includes setting an expiration time stamp for any of the records in accordance with a predefined length of time during which the record may reside in the database, and removing the record from the database when the expiration time stamp has been reached.

In another aspect of the invention the method further includes storing any of the objects in the storage unit in compressed form, and decompressing any of the records prior to loading the records into the database.

In another aspect of the invention the method further includes choosing the key based on a calculated likelihood that a future query of the database will select records on the basis of key values for the key, where the key is chosen if the likelihood exceeds a predefined value.

In another aspect of the invention the method further includes choosing the key where a past query of the database selected records on the basis of key values for the key.

In another aspect of the invention the mapping step includes using a single mapping record to map any of the objects to a plurality of the records contained in the object that have the same key value.

In another aspect of the invention the mapping step includes using a first mapping record to map any of the objects to a first plurality of the records contained in the object that have a first key value, and a second mapping record to map the object to a second plurality of the records contained in the object that have a second key value.

In another aspect of the invention the method further includes generating any of the objects to include only records with the same key value.

In another aspect of the invention the method further includes generating any of the objects to include only records having a key value from among any of a predefined number of different key values.

In another aspect of the invention the method further includes generating any of the objects to include a plurality of partitioned objects, each partitioned object including a subset of the records in the object, which subset is identified by a partitioning key.

In another aspect of the invention the method further includes loading records from any of the partitioned objects in parallel to corresponding partitions of the database.

In another aspect of the invention the method further includes generating any of the objects by first populating the database with any of the records, and then removing any of the records from the database into newly-formed objects which are then stored in the storage unit.

In another aspect of the invention the method further includes storing any of the records in any of the objects where the stored records belong to one or more tables in the database, where the database includes other tables having records not stored in the objects.

In another aspect of the invention a computer-implemented program is provided embodied on a computer-readable medium, the computer-implemented program including a first code segment operative to store a plurality of objects, each containing at least one record, in a storage unit, a second code segment operative to map the objects to the records which they contain, a third code segment operative to receive a Dynamic Load Request including a key value of desired records, a fourth code segment operative to search the mapping to determine which of the objects in the storage unit contain records that match the key value, and a fifth code segment operative to load any of the matching records into a relational database.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

Figure 1:
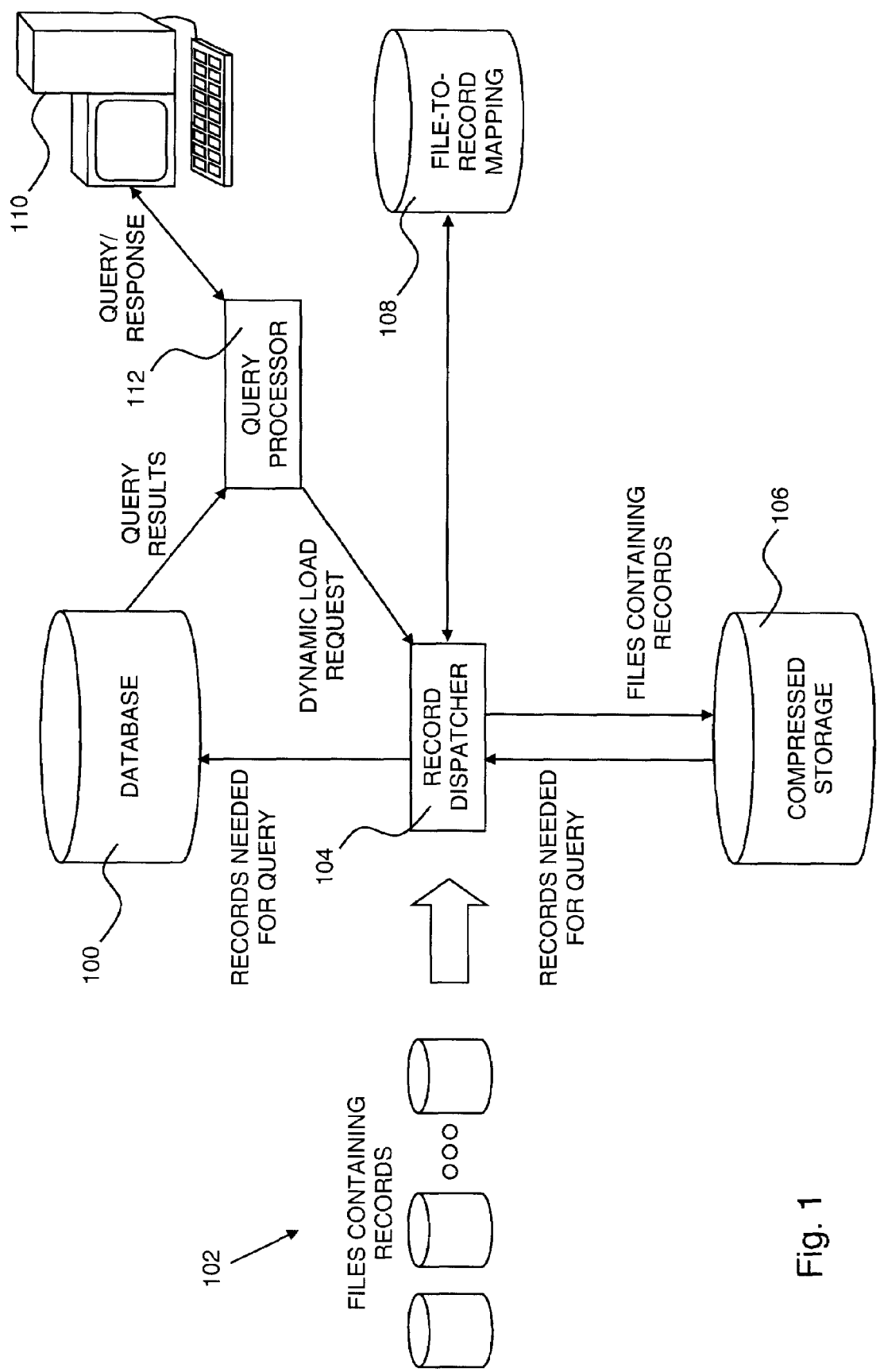
FIG. 1 is a simplified conceptual illustration of a relational database architecture with Dynamic Load capability, constructed and operative in accordance with an embodiment of the present invention.
Figure 2:
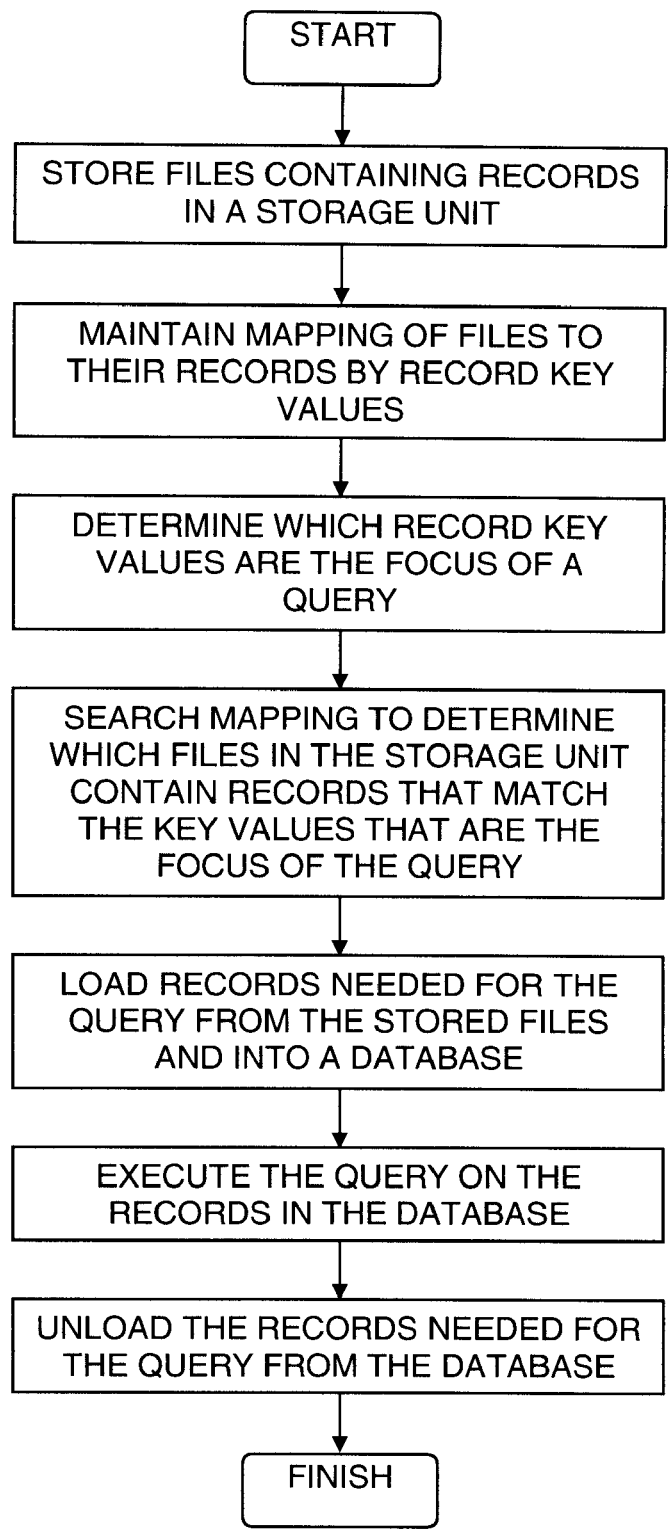
FIG. 2 is a simplified flowchart illustration of an exemplary method of operation of a system employing the architecture of FIG. 1, operative in accordance with an embodiment of the present invention.

Reference is now made to FIG. 1, which is a simplified conceptual illustration of a relational database architecture with Dynamic Load capability, constructed and operative in accordance with an embodiment of the present invention, and additionally to FIG. 2, which is a simplified flowchart illustration of an exemplary method of operation of a system employing the architecture of FIG. 1, operative in accordance with an embodiment of the present invention. In the architecture and method of FIGS. 1 and 2, a relational database 100 is shown for storing records, such as may be provided in one or more data files 102. Rather than store all incoming records in database 100 for the duration of their retention periods as is known in the art, a record dispatcher 104 stores files 102 in a storage unit 106, preferably in compressed form using conventional compression techniques. A mapping 108 of files to the records they contain is preferably maintained by record dispatcher 104. For example, as is shown in the following table, mapping 108 may map the name of each file stored in storage unit 106 to the value of a key, also referred to as a file association key, selected to identify each record the file contains.

TABLE A

| File Name | Key Value |
| --- | --- |
| recfile1.dat | 28.01.2005 10:35:00 |
| recfile2.dat | 28.01.2005 10:45:00 |
| ... | ... |
| recfile98.dat | 30.01.2005 21:00:00 |
| recfile98.dat | 30.01.2005 22:10:00 |

Thus, in the example shown, recfile1.dat includes one or more records having a key value of "28.01.2005 10:35:00" representing a time stamp, while recfile2.dat includes one or more records having a key value of "28.01.2005 10:45:00."

Preferably, the number of files 102 should be fewer than the number of records they contain (e.g., one million records should not be stored in one million files, but in one thousand files). The number of files 102 used to store records for database 100 may be determined as a function of the key that is selected for grouping records, where the key may be chosen using any known key selection techniques. For example, the key may be chosen based on a requirement that all queries to database 100 depend on specified values of the key. The key may also be chosen so that the cardinality of the set of records having any discrete value of a selected key is limited by the practical ability of the database computer to load that many records in a reasonable, application-defined amount of time. For the sake of generality, the term "key" as used herein may refer to a set of one or more keys, while a "key value" may refer to a unique combination of values of a set of one or more keys. By generalizing a key in this manner, the number of distinct values increases, and thus the cardinality of the corresponding set of records decreases, providing the ability to tune a practical balance between cardinality of the sets of records and loading time.

The following mechanisms may be used to further tune the choice of keys:

1. In case record set cardinality is too large in that it exceeds the practical ability of the database computer to load that many records in a reasonable, application-defined amount of time, it is possible to use another key in the records which can be hashed to a highly uniform distribution among the records, and divide the record set according to this hashing value to a group of sub-sets. This option is used when the database computer 100 can support parallel loading of the group of sub-sets of the respective record set.
2. In case record set cardinality is very low in that it does not sufficiently utilize the practical ability of the database computer to load that many records in a reasonable, application-defined amount of time, the cardinality of the set of key-values becomes too close to the cardinality of the original database. The cardinality of the set of key-values can be reduced by mapping of the original key values into a smaller set of values, and using the result value as the basis for defining the set of matching records. Examples of mapping functions include using a modulus function over integers, or truncation of strings, and so forth. As a result, that cardinality can be reduced to a practical level. This will result with an increased cardinality of the records set per mapped value of the key.

In another example of key selection, the key may be selected based on knowledge of previous queries of database 100 as using that key, or as part of the work done when designing a new database model for database 100. If a file stored in storage unit 106 contains multiple records with the same key value, a single record in mapping 108 is preferably used to represent the fact that at least one record in the file has the particular key value. Where a file contains records with different key values, multiple records in mapping 108 are preferably used, as is shown for recfile98.dat, which includes one or more records having a key value of "30.01.2005 21:00: 00" as well as one or more records having a key value of "30.01.2005 22:10:00."

Although a time stamp key is shown in the current example, any key may be chosen. For example, where queries are performed on sales transaction records and focus on sales by region, files 102 may be mapped to their records by a "region" field instead of, or in addition to, the time stamp field.

Preferably, the applications that generate files 102 do so in such a way that all of the records in a file have the same key value, or of a relatively few different key values. Alternatively, record dispatcher 104 may form new files from files 102, creating files whose records share the same or relatively few different key values. In this case, formation of the new files may be performed using files 102 as input, and/or by first populating database 100 with records from files 102, and then extracting and optionally removing records from database 100 into newly-formed files which are then stored in storage unit 106. Where a file includes records having different key values, the number of different key values that the records in a file may have may be predefined, such as where a file contains records with no more than five different key values.

When a query is received from a computer 110 at a query processor 112, such as a computer server supporting a Structured Query Language (SQL) Application Program Interface (API), query processor 112 determines which record key value(s) is/are the focus of the query. Preferably, all queries received by query processor 112 interrogate the same key used to group records into files 102. For example, the query may be for all records in database 100 whose time stamps are in a certain range. Query processor 112 communicates a "Dynamic Load Request" including the desired key value parameters to record dispatcher 104 which searches mapping 108 to determine which files in storage unit 106 contain records that match the key values that are the focus of the query. Record dispatcher 104 then loads either the entire contents of the identified files, or just the records that match the desired key values, from storage unit 106 into database 100, after decompression of the files and/or records as necessary. Query processor 112 then executes the query on database 100.

Record dispatcher 104 may load the relevant records into database 100 in response to an SQL Data Manipulation Language (DML) statement or other RDBMS Application Programming Interface (API) command issued by a client application on computer 110. Records may be loaded using one or more synchronous tasks executing either an RDBMS fast load utility or an SQL DML interface based utility. After the required subset of data is loaded into database 100, and the query is executed by the query processor 112, the results are preferably provided back to the client application on computer 110.

After data is loaded into database 100, record dispatcher 104 may update mapping 108 to reflect that the records have been loaded into database 100 and may also set an expiration time stamp in accordance with a predefined length of time during which records may reside in database 100. When the expiration time stamp has been reached, the data is preferably removed from database 100, and mapping 108 is updated to indicate that the records are no longer in database 100.

It is appreciated that the operations executed by record dispatcher 104 may be performed without client applications on computer 110 being aware of their execution. Thus, on receiving an SQL DML statement or other RDBMS API command issued by a client application on computer 110, record dispatcher 104 analyses the statement or command and extracts the keys by which dynamic loading as described above may be performed for those records which are not yet resident in database 100. After the required subset of data is loaded into database 100, record dispatcher 104 allows the original statement or command to proceed without requiring the client application on computer 110 to issue another command, thus creating a seamless integration of the dynamic loading of data into database 100.

Alternatively, computer 110 may be aware that a dynamic loading by record dispatcher 104 is required prior to issuing a query, and may thus instruct query processor 112 to issue the Dynamic Load Request to record dispatcher 104, or may itself issue the Dynamic Load Request to record dispatcher 104.

Figure 3:
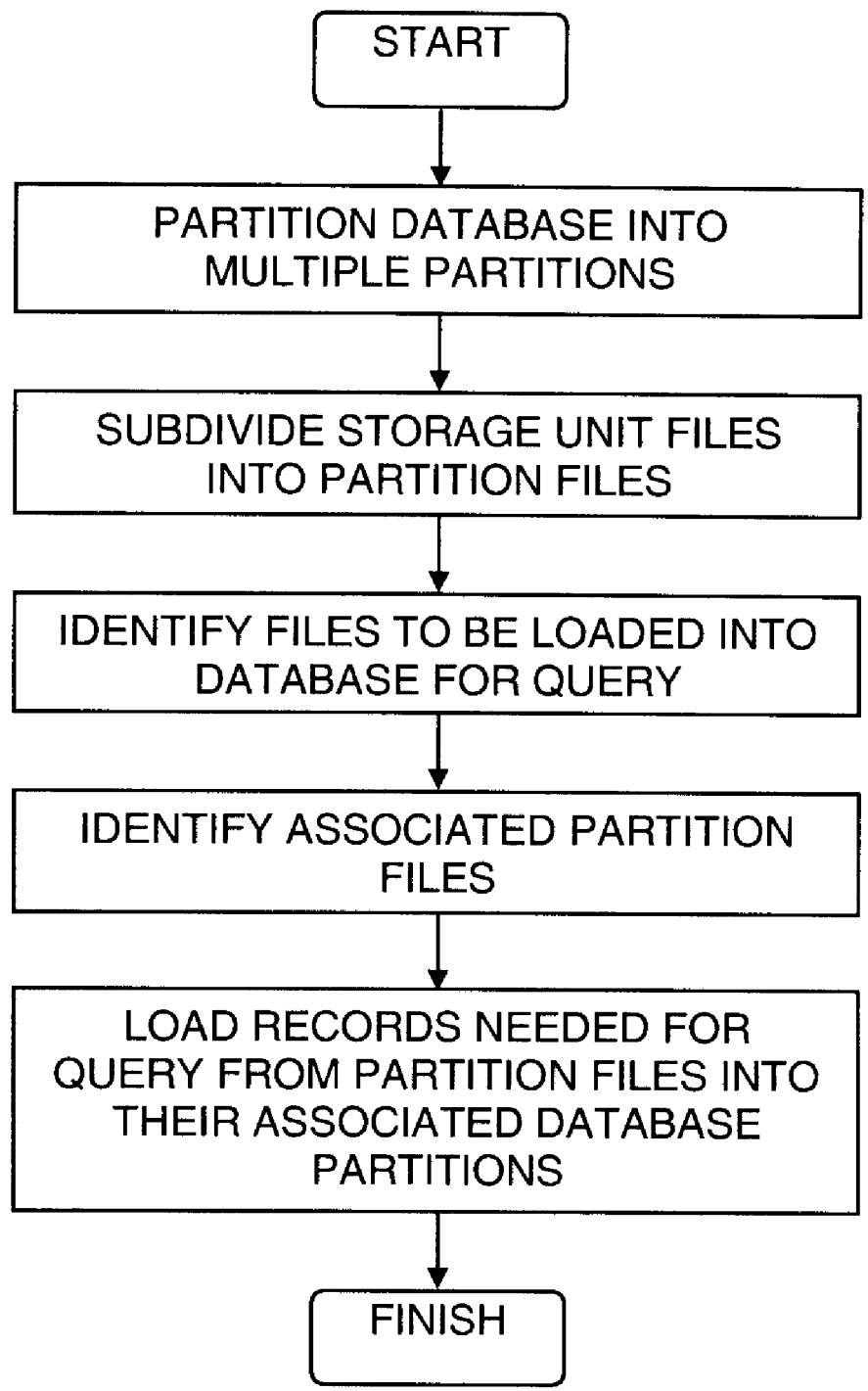
FIG. 3 is a simplified flowchart illustration of an exemplary method of operation of a system employing the architecture of FIG. 1 with a partitioned database, operative in accordance with an embodiment of the present invention.

Reference is now made to FIG. 3, which is a simplified flowchart illustration of an exemplary method of operation of a system employing the architecture of FIG. 1 with a partitioned database, operative in accordance with an embodiment of the present invention. In the method of FIG. 3, the present invention may be adapted for use with various partitioned database implementations. In one such implementation, data are physically split on the basis of value ranges specified using range partitioning keys which are independent of the association keys used to create files 102. For example, a table that contains sales data for different geographic regions may be physically partitioned into multiple distinct partitions where the sales region and/or sales year act as a partitioning key, and where the value of the partitioning key in each record determines the physical partition in which the record is placed based on predefined ranges of partitioning key values explicitly associated with each of the physical partitions.

Alternatively, partitioned data may be separated based on a computed hash key that is defined on one or more table columns, with the end goal being an equal distribution of values among partitions. During insert and/or update operations, the database engine generates a hash from the data record to determine which partition will store the record. During retrieval, the database engine retrieves all data in parallel during query execution. The present invention may thus be adapted for use with partitioned databases by ensuring that all of the records in a given file 102, such as may be received by or generated by record dispatcher 104, is associated with the same partition. Thus, all records that are retrieved from a file 102 are loaded into the respective partition of database 100, and indeed, records from different files 102 may be loaded in parallel to different partitions of database 100 in response to different queries. Preferably, the partitioning key is different from the file association key, since the file association key is typically the same for all records in files 102, and thus cannot be used to further subdivide these records to smaller subsets. The computed hash key, being a different key and selected as described above, will subdivide these records into as many subsets as there are partitions. For instance, if there are N partitions, each file 102 that is associated with a certain set of key values is further partitioned into N files, each being approximately the same size. Record dispatcher 104 then identifies which of files 102 are to be loaded according to the keys in the "Dynamic Load Command." For each file 102 that is identified for loading, record dispatcher 104 further identifies its N partitioned files, and loads them in parallel to their respective partitions as required. It will be appreciated that where such partitioning is used, the files 102 are logical entities that are made up of one or more physical partitioned files.

Figure 4:
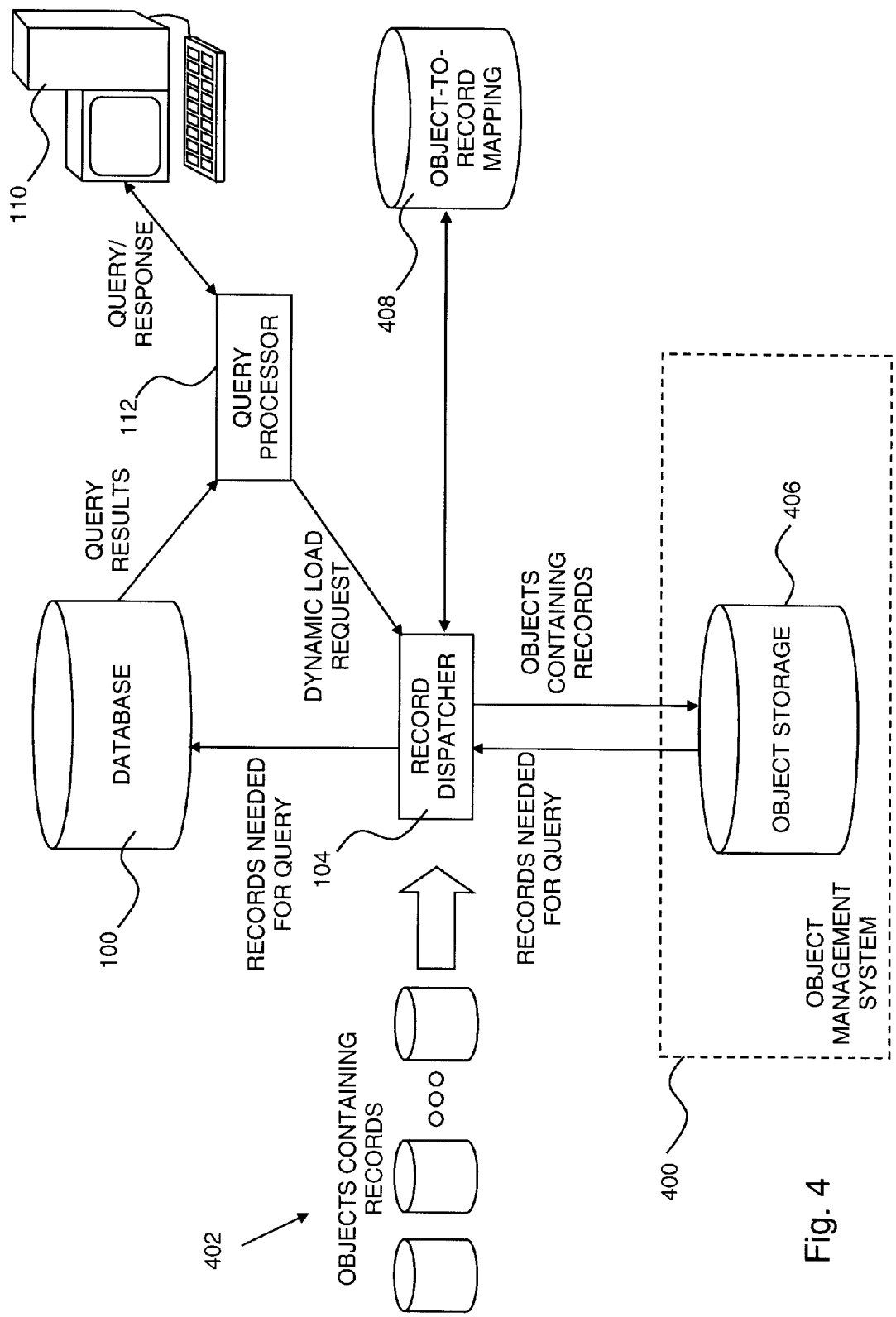
FIG. 4, which is a simplified conceptual illustration of an alternate relational database architecture with Dynamic Load capability, constructed and operative in accordance with an embodiment of the present invention

Reference is now made to FIG. 4, which is a simplified conceptual illustration of an alternate relational database architecture with Dynamic Load capability, constructed and operative in accordance with an embodiment of the present invention. The architecture of FIG. 4 is substantially similar to that of FIG. 1, with the notable exception that records that are stored separately from database 100 are contained within objects, of which the files of FIG. 1 are only one specific type, which are maintained by an object management system 400, such as the IBM DB2 Content Manager™, commercially-available from IBM Corporation, Armonk, N.Y., or the Enterprise Content Manager™, commercially-available from FileNet Corporation, 3565 Harbor Boulevard, Costa Mesa, Calif. Object management system 400 stores objects 402 that are received by record dispatcher 104 as described hereinabove, and/or objects that are generated by record dispatcher 104 as described hereinabove, in an object storage 406. As with the files of FIG. 1, the objects stored in object storage 406 are mapped to the records they contain in a mapping 408.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A relational database method with Dynamic Load capability, the method comprising:
   storing a plurality of objects, each containing at least one record, in a storage unit;
   mapping said objects to said records which they contain,
   receiving a Dynamic Load Request including a key value of desired records,
   searching said mapping to determine which of said objects in said storage unit contain records that match said key value, and
   loading any of said matching records into a relational database.

2. A method according to claim 1 wherein any of said steps are performed with respect to said objects that are in the form of data files.

3. A method according to claim 1 and further comprising:
   receiving a query from a computer;
   determining at least one key value that is the focus of said query; and
   executing said query on said database subsequent to said matching records being loaded into said database.

4. A method according to claim 1 and further comprising updating said mapping to indicate the current location of any of said records as being in either of said database and said storage unit.

5. A method according to claim 1 and further comprising:
   setting an expiration time stamp for any of said records in accordance with a predefined length of time during which said record may reside in said database; and
   removing said record from said database when said expiration time stamp has been reached.

6. A method according to claim 1 and further comprising:
   storing any of said objects in said storage unit in compressed form; and
   decompressing any of said records prior to loading said records into said database.

7. A method according to claim 1 and further comprising choosing said key based on a calculated likelihood that a future query of said database will select records on the basis of key values for said key, wherein said key is chosen if said likelihood exceeds a predefined value.

8. A method according to claim 1 and further comprising choosing said key where a past query of said database selected records on the basis of key values for said key.

9. A method according to claim 1 wherein said mapping step comprises using a single mapping record to map any of said objects to a plurality of said records contained in said object that have the same key value.

10. A method according to claim 1 wherein said mapping step comprises using a first mapping record to map any of said objects to a first plurality of said records contained in said object that have a first key value, and a second mapping record to map said object to a second plurality of said records contained in said object that have a second key value.

11. A method according to claim 1 and further comprising generating any of said objects to include only records with the same key value.

12. A method according to claim 1 and further comprising generating any of said objects to include only records having a key value from among any of a predefined number of different key values.

13. A method according to claim 12 and further comprising generating any of said objects to include a plurality of partitioned objects, each partitioned object including a subset of said records in said object, which subset is identified by a partitioning key.

14. A method according to claim 13 and further comprising loading records from any of said partitioned objects in parallel to corresponding partitions of said database.

15. A method according to claim 1 and further comprising generating any of said objects by first populating said database with any of said records, and then removing any of said records from said database into newly-formed objects which are then stored in said storage unit.

16. A method according to claim 1 and further comprising storing any of said records in any of said objects where said stored records belong to one or more tables in said database, wherein said database includes other tables having records not stored in said objects.

\* \* \* \* \*